(12) United States Patent
Zlotnick

(10) Patent No.: US 9,300,738 B2
(45) Date of Patent: *Mar. 29, 2016

(54) VIRTUAL STATE MACHINE FOR MANAGING OPERATION REQUESTS IN A CLIENT SERVER ENVIRONMENT

(75) Inventor: Aviad Zlotnick, Mitzpeh Netofa (IL)

(73) Assignee: International Business Machines Corporation, Armonk, NY (US)

(*) Notice: Subject to any disclaimer, the term of this patent is extended or adjusted under 35 U.S.C. 154(b) by 692 days.

This patent is subject to a terminal disclaimer.

(21) Appl. No.: 11/969,145

(22) Filed: Jan. 3, 2008

(65) Prior Publication Data

US 2009/0177731 A1 Jul. 9, 2009

(51) Int. Cl.
G06F 15/173 (2006.01)
H04L 29/08 (2006.01)
H04L 12/747 (2013.01)

(52) U.S. Cl.
CPC .......... *H04L 67/1097* (2013.01); *H04L 45/742* (2013.01); *H04L 67/34* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 5,043,871 | A * | 8/1991 | Nishigaki et al. ................. | 1/1 |
| 5,386,518 | A * | 1/1995 | Reagle ................. | G06F 13/385 710/316 |
| 5,720,028 | A * | 2/1998 | Matsumoto et al. ......... | 714/5.11 |
| 6,098,149 | A | 8/2000 | Ofer et al. | |
| 6,484,187 | B1 * | 11/2002 | Kern ................. | G06F 17/30353 1/1 |
| 6,874,046 | B1 | 3/2005 | LeCrone et al. | |
| 6,950,915 | B2 * | 9/2005 | Ohno et al. ................... | 711/162 |
| 7,065,589 | B2 | 6/2006 | Yamagami | |
| 7,111,004 | B2 | 9/2006 | Beardsley et al. | |
| 7,117,310 | B2 | 10/2006 | Chatterjee et al. | |
| 8,150,806 | B2 | 4/2012 | Boyd et al. | |
| 2002/0112141 | A1 * | 8/2002 | Greenwood ............. | G06F 9/06 712/1 |
| 2003/0005231 | A1 * | 1/2003 | Ooi ....................... | G06F 3/0607 711/131 |
| 2003/0051111 | A1 * | 3/2003 | Nakano et al. ................ | 711/162 |
| 2003/0149848 | A1 * | 8/2003 | Ibrahim et al. ................ | 711/154 |
| 2004/0059840 | A1 | 3/2004 | Perego et al. | |
| 2004/0260970 | A1 * | 12/2004 | Beardsley et al. ................ | 714/6 |
| 2005/0036422 | A1 | 2/2005 | Sasaki | |
| 2005/0114464 | A1 | 5/2005 | Shai et al. | |
| 2007/0038699 | A1 * | 2/2007 | Oikarinen et al. ............ | 709/203 |
| 2007/0239944 | A1 | 10/2007 | Sriram et al. | |
| 2009/0070383 | A1 * | 3/2009 | Boyd et al. .................... | 707/200 |
| 2010/0332481 | A1 * | 12/2010 | Rowney ....................... | 707/747 |

FOREIGN PATENT DOCUMENTS

WO WO2006086379 A2 8/2006

OTHER PUBLICATIONS

Sun Microsystems, Solaris 10 What's New? Nov. 2006.
"Hard Disk Controller Interfaces to SMDs and Soft Sector Devices", Computer Designs, V 21, n12, Dec. 1982 pp. 45 and 48.

* cited by examiner

Primary Examiner — Ninos Donabed
(74) Attorney, Agent, or Firm — Zilka-Kotab, PC

(57) ABSTRACT

A method of managing operations performed in a client-server environment comprises receiving a set of commands; executing a first command in the set, wherein the first command is associated with a second command; and executing the second command, in response to determining that a first event has occurred.

14 Claims, 5 Drawing Sheets

US 9,300,738 B2

VIRTUAL STATE MACHINE FOR MANAGING OPERATION REQUESTS IN A CLIENT SERVER ENVIRONMENT

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

BACKGROUND OF THE INVENTION

1. Field of the Invention

The present invention relates generally to client-server environments and, more particularly, to a system and method for managing operations in a data storage environment.

2. Background Information

Prior Art FIG. 1 illustrates an operating environment 100 for a client-server architecture in which storage controllers 120 operate in response to requests or commands issued by a managing entity 110. Storage controllers 120, for example, may be connected to storage media 140 and 150. After a storage controller 120 performs a requested operation, an acknowledgement is submitted from the storage controller 120 to the managing entity 110 to confirm the completion of the requested operation.

If the acknowledgement is not received by the managing entity 110, due to data loss during transmission, managing entity 110 may demand for the operation to be performed again, by resubmitting the prior request. Disadvantageously, repeated requests results in duplicate performance of the requested operation. Such additional operations are redundant and undesirable.

In certain systems, such as data storage systems with a plurality of storage controllers 120, different storage controller machines may be implemented to operate according to command structures that are distinguishable from one storage controller machine to the next. In such systems, managing entity 110 will have to support the corresponding command structures for multiple storage controllers 120. As such, it is possible that a managing entity 110 will have to be configured to support multiple different types of command structures so that a receiving storage controller 120 can understand an issued command.

The above-noted lack of unified approach and the requirement for acknowledging each request results in excessive overhead, which is expensive and also burdensome for an administrator of a client-server system. Furthermore, in the current client-server systems, the managing entity is the sole point of decision-making logic, such that most if not all the logic needed for controlling the operation of the storage controller systems or performing certain operations generally resides in the managing entity. It would be desirable to delegate some of the noted decision making logic to the storage controller systems to reduce the overhead of the managing entity and to limit the client's dependence on the managing entity.

Thus, methods and systems are needed that can overcome the aforementioned shortcomings and allow a managing entity to delegate the performance of certain duties to its storage controllers.

SUMMARY OF THE INVENTION

The present disclosure is directed to systems, methods and corresponding products that facilitate managing requested operations in a client-server environment based on predefined operation states.

In accordance with one embodiment, a method for managing operations in a data storage system comprising at least a first storage controller operating according to a plurality of operation states set by a managing entity is provided. The method transitioning among a plurality of operation states and performing a plurality of operations associated with said plurality of operation states, in response to the managing entity transmitting a logic code to the first storage controller, wherein the logic code comprises state and event information respectively readable and executable by the first storage controller.

In one embodiment, the first storage controller operates based on a first proprietary operation algorithm and wherein the managing entity compiles the logic code to be compatible with the proprietary operation algorithm implemented for the first storage controller. The state and event information may be included in the logic code to instruct the first storage controller about performing a plurality of operations in response to detecting a plurality of respective states, instead of the managing entity directly communicating multiple individual requests for performing one or more operations to the first storage controller each time the managing entity determines that the controller's operation state has changed.

The method may further comprise determining whether a first operation state is changed to a second operation state; determining a second operation associated with the second operation state according to the state and event information stored in the logic code; and performing the second operation.

In accordance with another aspect or embodiment, a method of managing operations performed in a client-server environment comprises receiving a set of commands; executing a first command in the set, wherein the first command is associated with a second command; and executing the second command, in response to determining that a first event has occurred.

In one embodiment, the set of commands is transmitted from a client machine to a server machine to cause the server machine perform operations responsive to the first command and the second command in sequence, without server machine communicating with the client machine to determine which operation is to be performed after execution of the first command.

In another embodiment, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF THE PREFERRED EMBODIMENTS

The present disclosure is directed to systems and methods that facilitate managing performance of requested operations in a client-server environment based on predefined operation states.

In the following specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others. It should be noted that the principals and concepts disclosed herein are applicable to any client-server environment. In the following, however, an exemplary embodiment is disclosed as implemented in a data storage system for managing data replication events and operations performed by one or more storage controllers.

Figure 1:
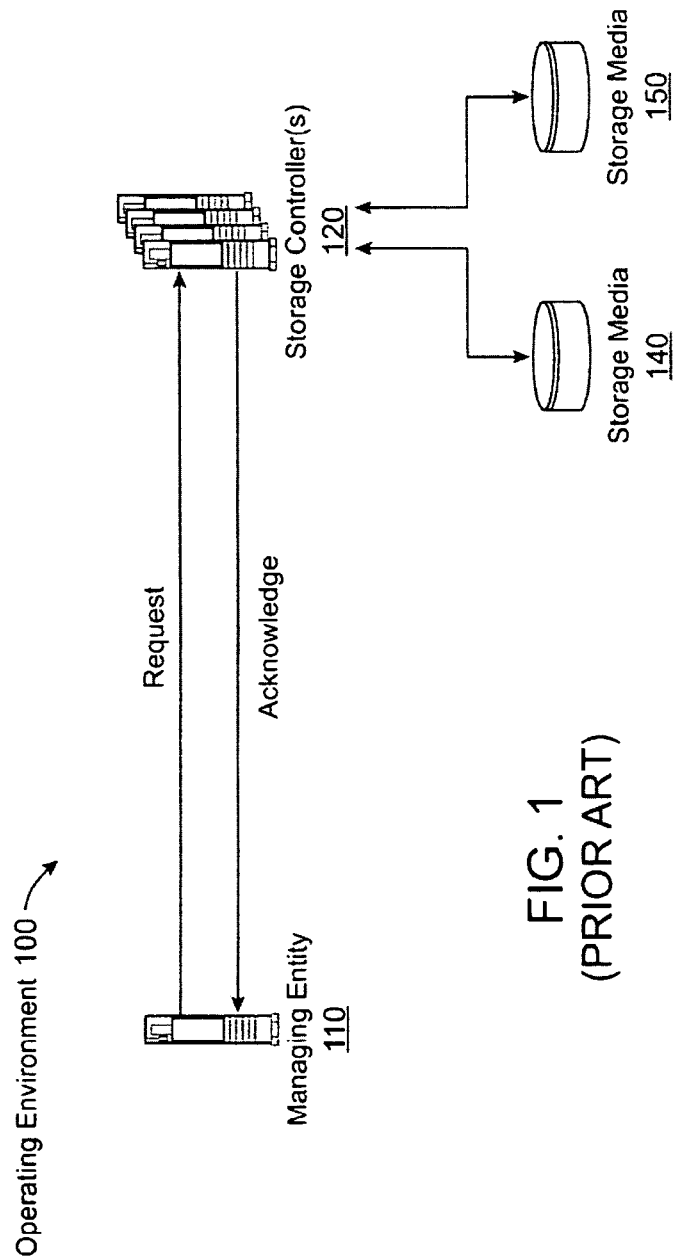
FIG. 1 illustrates an exemplary Prior Art operating environment illustrating a communication routine between a storage controller and one or more managing entity systems.
Figure 2:
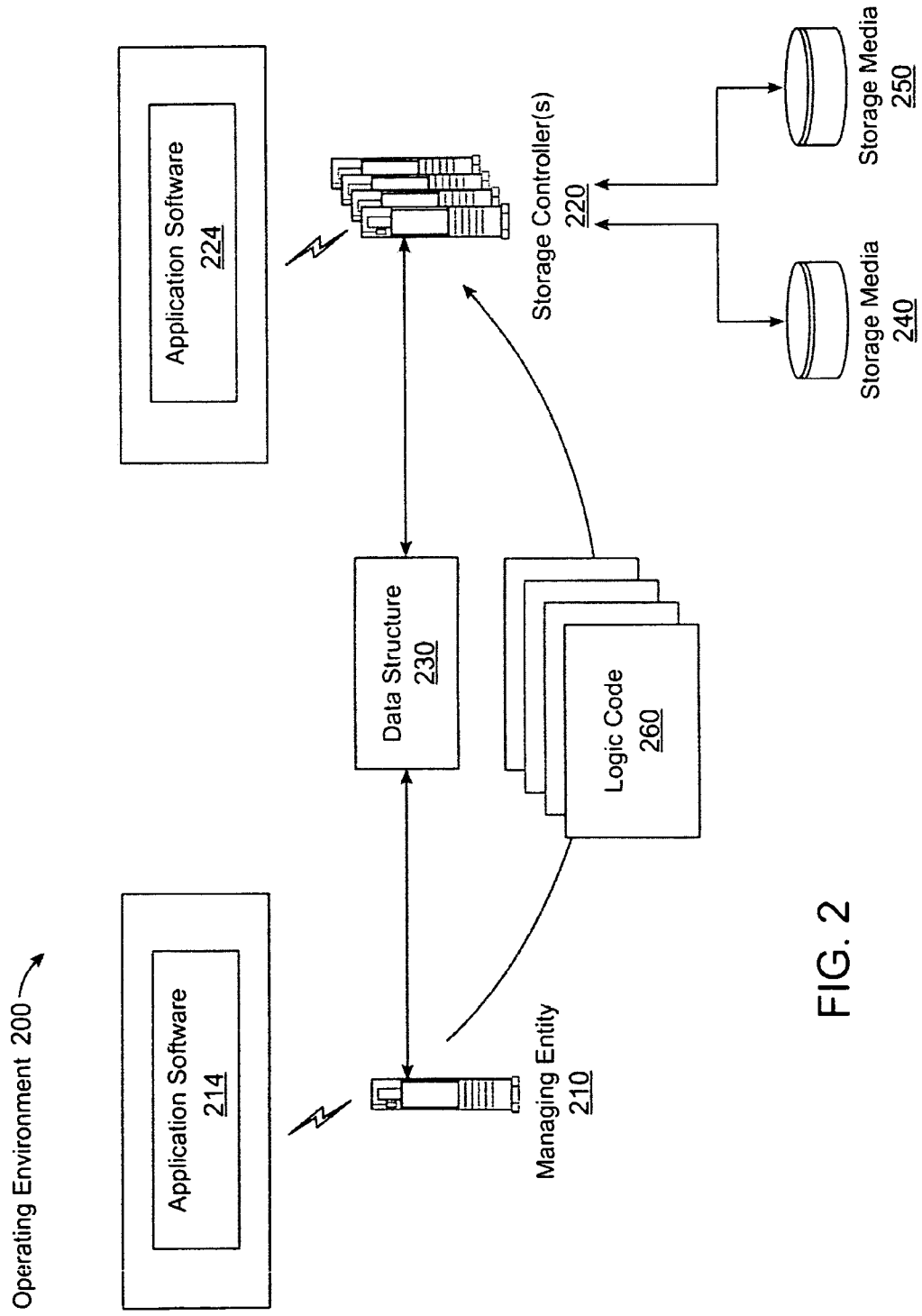
FIG. 2 illustrates an exemplary operating environment illustrating a communication routine between a managing entity and storage controller(s) in a storage network, in accordance with one embodiment.

Referring to FIG. 2, an exemplary operating environment 200 is illustrated in which a managing entity 210 and one or more storage controllers 220 communicate. Accordingly, application software 214 may be executed on managing entity 210 to transmit logic code 260 to one or more storage controllers 220. Logic code 260 may be, for example, a script file, an executable code, or other data structure that comprises state and event information, respectively readable and executable by said one or more storage controllers 220. As provided in further detail below, in one embodiment, content of logic code 260 defines a state machine based on which a plurality of operation states may be recognized and a plurality of operations associated with said plurality of operation states may be performed by a storage controller 220.

In one embodiment, application software 224 is executed on one or more storage controllers 220 to perform one or more operations according to operational states defined in logic code 260, when an operational state defined in the logic code 260 is detected. In certain embodiments, an optional data structure 230 may be also implemented to store state information when the state of a storage controller 220 changes from one state to another.

Data structure 230 may comprise one or more data tables, data arrays, linked lists, relational databases, or other types of logical data structure suitable for storing operation state information. In one embodiment data structure 230 may be utilized to store status information (e.g., on/off status) about various operational states of a data storage system (e.g., initial copy state, split writes state, read from secondary on error state, etc.). Preferably, logic code 260, data structure 230 and application software 224 are stored in storage media 240 local to storage controller 220.

Figure 3:
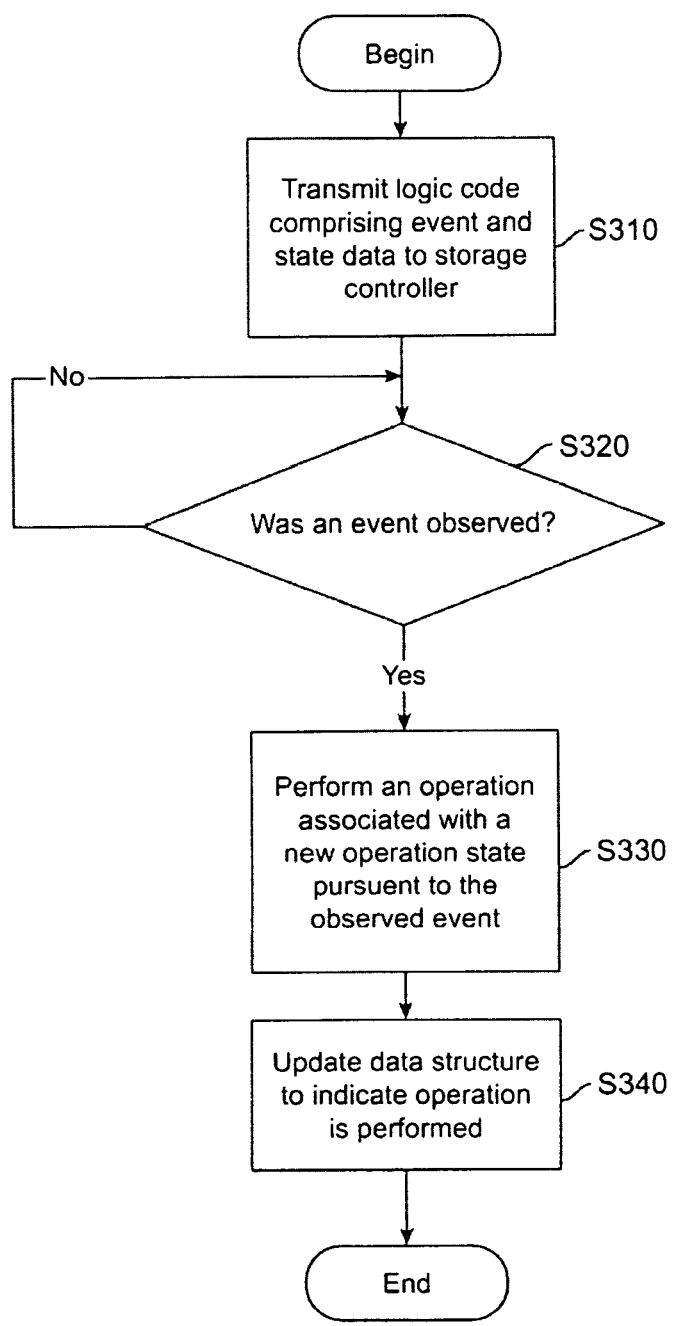
FIG. 3 is a flow diagram of a method for monitoring the operation state of the exemplary system of FIG. 2, in accordance with one embodiment.

Referring to FIGS. 2 and 3, application software 214 transmits logic code 260 from managing entity 210 or other resources to one or more storage controllers 220 (S310). In one embodiment, application software 214 compiles the same logic code 260 to be transmitted to one or more other storage controllers 220. Depending on implementation, if the receiving storage controllers 220 operate based on the same command structure, content of logic code 260 can be utilized by said one or more storage controllers 220 without any extra processing. Otherwise, application software 224 may intervene to process logic code 260 to match the command structure of a receiving storage controller 220.

In an environment where one or more storage controllers 220 operate based on differing command structures, application software 214 instead of sending the same logic code 260 provides a customized logic code 260 to the one or more storage controllers 220, so that the customized logic code 260 matches the corresponding command structure for said receiving storage controllers 220. Accordingly, the overhead for providing a logic code compatible with the command structure of the storage controller 220 may be allocated to either managing entity 210 or storage controller 220, or distributed therebetween.

Application software 224 may be also configured to monitor operation of storage controller 220 and to determine if a new event is observed by storage controller 220 (S320). Once application software 224 detects a change from a first operation state to a new operation state pursuant to a new event, application software 224 performs the respective operation associated with the new operation state (S330). Application software 224 determines the proper operation to be performed according to the content of logic code 260 and or the content of an event table in data structure 230.

For example, in some embodiments, logic code 260 defines a series of operational states in addition to series of one or more relationships between an operational state and an event or operation (e.g., initial copy, split writes, read from secondary on error, etc.) to be performed by application software 224 once said operational state is detected.

In exemplary embodiments, the relationships may be defined as objects that are ordered pairs of storage volumes (e.g., storage media 240 and 250) and difference sets between these volumes. The difference sets are called region lists. A set of independent behavior patterns may be defined that may be combined to form replication solutions between said volumes.

The behavior patterns, in one embodiment, are defined by various operation states such that, as provided above, application software 224 can monitor said operational states to cause a storage controller 220 to change its behavior (e.g., to perform an operation associated with a newly detected state). For example, detecting a copy state may cause a copy operation to be performed by a storage controller 220.

In some embodiments, application software 214 may define rules that govern the behavior of objects that have overlapping storage volumes. Accordingly, a storage controller 220 may export a virtual machine whose objects are the relationships, and whose machine language comprises the operation states, for example.

In an exemplary embodiment, the following operation states can be defined:

```
Track write operations in region list
    on
    off
Volume reserve
    none
    temporary
    persistent
Host write processing
    allow
    queue
    inhibit
Host read processing
    allow
    queue
    inhibit
Write location (where to write to)
    1st volume in the relationship
    2nd volume in the relationship
    both
Read location (where to read from)
    1st volume in the relationship
    2nd volume in the relationship
    2nd volume only for regions in the region list
    both - use first result
    both - verify same content
    either
Copy volume content
    none
    1st to 2nd
    2nd to 1st
Copy region list
    none
    1st to 2nd
    2nd to 1st
    merge 1st to 2nd
    merge 2nd to 1st
```

The above list is not meant to be exhaustive of all operational states, nor should it be construed as limiting the invention to the above exemplary list provided for the purpose of disclosing certain sample embodiments. Depending on implementation, additional operation states can be defined. For example, further operational states may be defined for error conditions, such as failed writes or reads. Further, in an exemplary embodiment, the following exemplary pseudo algorithm may be implemented in the form of logic code 260:

```
1:  Track write operations in region list = off
    Volume reserve = none
    Host write processing = allow
    Host read processing = allow
    Write location (where to write to) = both
    Read location (where to read from) = 1st volume in the
relationship
    Copy volume content = 1st to 2nd
    Copy region list = none
    Event table: CopyVolumeContentFinished: 2,
            WriteToRemoteFailed:3
2:  Track write operations in region list = off
    Volume reserve = none
    Host write processing = allow
    Host read processing = allow
    Write location (where to write to) = both
    Read location (where to read from) = both, use first result
    Copy volume content = none
    Copy region list = none
    Event table: WriteToRemoteFailed: 3
3:  Track write operations in region list = on
    Volume reserve = none
    Host write processing = allow
    Host read processing = allow
    Write location (where to write to) = 1st volume in the
relationship
    Read location (where to read from) = 1st volume in the
relationship
    Copy volume content = none
    Copy region list = none
    Event table: WriteToRemotePossible: 1
```

In the above exemplary implementation, three commands are defined and included in logic code 260 by application software 214 and transmitted to storage controller 220. In this example, the first state "1" performs an initial copy of a first volume to a second volume, and at the same time also mirrors writes to the second volume, for example. When the initial copy completes, the two volumes are identical, except for writes in progress. This can be considered a "Full Duplex" state, for example.

Referring to the event table, once application software 224 receives a CopyVolumeContentFinished event, for example, it causes the state of storage controller 220 to change to state "2," for example. However, if any write to a remote system fails, manifested by receiving a WriteToRemoteFailed event, the required state is such that copying content to the remote stops, and writes are not mirrored, but are marked in a region list. This implies state "3" (e.g., suspended mode). As provided above, the event table indicates that receiving the WriteToRemoteFailed event should cause a transition to state "3."

The event table in state "2" provides that failure to transfer data to the remote volume results in a transition to suspended mode. In suspended mode the event table provides that once it is possible to write to the remote again, storage controller 220 is to transition back to state "1" (e.g., initial copy state).

Again, it should be noted that the above exemplary logic code is provided for the purpose of illustration only. Other schemes may be constructed around commands that do not specify the modes, but are functional in nature.

In accordance with one embodiment, relationships and operation states are nonvolatile and persistent (i.e., stored on disk or in flash memory) and the process of updating the operation states in data structure 230 is idempotent, because the process updates the state values rather than requesting for an operation to be performed and acknowledged. Further, in some embodiments, one or more operation states may have automatic value changes. For example, a copy state may return to "none" after a copy operation is completed. Such transitions may be accompanied by notifications that can be captured by application software 214.

In one or more embodiments, application software 214 running on managing entity 210 provides logic code 260 to define operational states and a state machine for performing the respective operations for each state on the storage controllers 220. Advantageously, once an operation state is detected, storage controller 220 performs an operation associated with the detected operation state according to state and event information included in logic code 260.

In some embodiments, the content of data structure 230 may be optionally updated, for example, to indicate that a first operation is requested, or that an operation is scheduled to be performed or is in progress, or that an operation has been performed (i.e., completed).

Accordingly, in some embodiments, there may be no need for managing entity 210 to constantly monitor the operational state of a plurality of storage controllers 220 or forward separate and individual requests directly to each storage controller 220 to demand the performance of a certain operation each time the operational state of one of said storage controllers 220 changes. Further, in some embodiments, there may be no need for the storage controller 220 to provide an acknowledgement in response to performing the requested operation.

The lack of a requirement for managing entity 210 to constantly monitor the status of storage controllers 220, and the lack of the requirement for a storage controller 220 to respond with an acknowledgement each time an operation is scheduled or performed has several advantages over the related art methods and systems.

First, the system overhead associated with managing, sending and receiving the requests and acknowledgments is eliminated or reduced. Second, managing entity 210 and application software 214 will be less complex and more robust since they won't need to support various replication algorithms or communicate with various application software 224 implemented for different storage controllers 220. Third, the possibility of duplicative requests, in the event that an acknowledgment is lost, is reduced or eliminated. Fourth, implementing an interface between managing entity 210 and storage controllers 220 can be achieved at relatively low cost.

Referring back to FIG. 3, in certain embodiments storage controller 220 may be configured to update data structure 230 or another data structure (not shown) to indicate that an operation has been performed (S340). It is also noteworthy that the above update procedure, depending on implementation, may be applicable to a select few operations or operation states. That is, in some embodiments, for certain operations, managing entity 210 may continue to directly submit requests to storage controllers 220.

As such, in one or more embodiments, the above-disclosed status management scheme may be utilized in combination with a request-acknowledgement scheme. For example, a first operation may be performed in response to instructions provided in logic code 260 for a first operation, and a second operation may be performed in response to managing entity 210 submitting a request directly to a storage controller 220 to perform the second operation.

In different embodiments, the invention can be implemented either entirely in the form of hardware or entirely in the form of software, or a combination of both hardware and software elements. For example, computing systems 210, 220 and application software 214, 224 may comprise a controlled computing system environment that can be presented largely in terms of hardware components and software code executed to perform processes that achieve the results contemplated by the system of the present invention.

Figure 4:
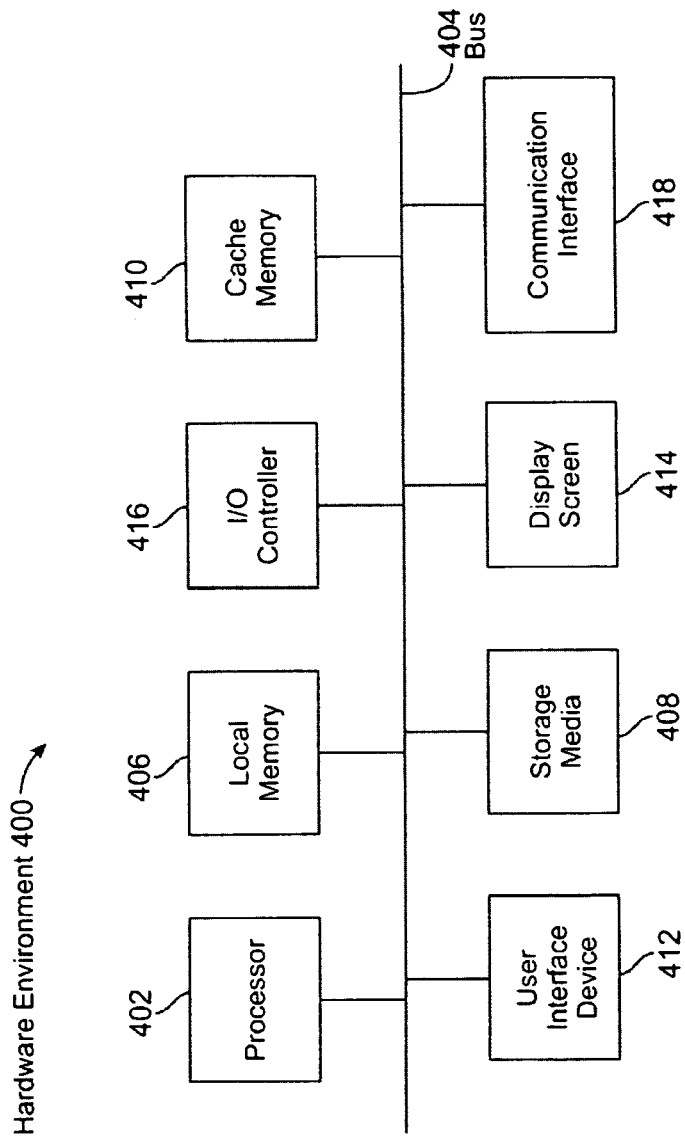
FIGS. 4 and 5 are block diagrams of hardware and software environments in which a system of the present invention may operate, in accordance with one or more embodiments.
Figure 5:
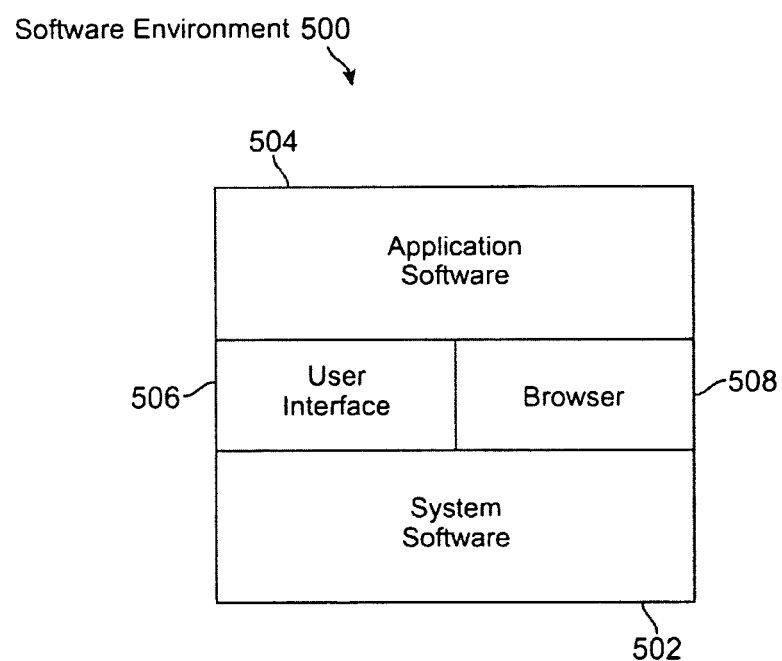

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the soft are provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, application software 214 and 224 may be implemented as system software 502 or application software 504 executed on one or more hardware environments. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of an operating system after being loaded from storage media 408 into local memory 406. In a client-server architecture, application software 504 may comprise storage controller software and managing entity software. For example, in one embodiment of the invention, storage controller software is executed on computing systems 110 or 120 and managing entity software is executed on a managing entity system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for managing operations in a data storage system comprising:
   receiving logic code and/or a data structure from a managing entity at a storage controller, the logic code and/or data structure defining a plurality of operation states and at least one operation to be performed by the storage controller upon detection of each of the operation states, wherein the logic code is based on a different command structure than a command structure used by the storage controller;
   monitoring the storage controller for detecting a change in operation state of the storage controller;
   detecting the change in operation state of the storage controller based on the monitoring;
   performing the at least one operation associated with the operation state in the logic code and/or data structure upon detecting the change in operation state of the storage controller; and
   compiling the logic code at the storage controller to be compatible with the command structure of the storage controller;
   wherein the storage controller performs the at least one operation without responding to the managing entity with an acknowledgement that the at least one operation has been performed.

2. The method of claim 1, wherein the operation states of the storage controller are not monitored by the managing entity.

3. The method of claim 1, wherein the logic code is received from the managing entity, wherein the logic code defines a state machine based on which of the plurality of operation states are recognized and the operations associated with the plurality of operation states are performed.

4. The method of claim 1, wherein the data structure is received, and further comprising storing the data structure locally to the storage controller in nonvolatile memory and updating state information stored in the data structure each time one of the operations is performed to reflect that the operation has been performed.

5. The method of claim 4, wherein the data structure comprises the plurality of operation states, wherein each operation state is associated with an operation for replicating data in a data storage system, wherein the managing entity is remote from the storage controller, wherein the storage controller comprises one or more storage media, wherein at least two of the one or more storage media have overlapping storage volumes.

6. A system for managing operations in a data storage system comprising:
   a storage controller, comprising a processor, configured to receive logic code and/or a data structure from a managing entity, the logic code and/or data structure defining a plurality of operation states and at least one operation to be performed by the storage controller upon detection of each of the operation states, wherein the logic code is based on a different command structure than a command structure used by the storage controller;
   the storage controller being configured to monitor the storage controller for detecting a change in operation state of the storage controller;
   the storage controller being configured to detect the change in operation state of the storage controller based on the monitoring; and
   the storage controller being configured to perform the at least one operation associated with the operation state in the logic code and/or data structure upon detecting the change in operation state of the storage controller,
   wherein the storage controller is configured to compile the logic code to be compatible with a command structure of the storage controller when the logic code is based on a different command structure than the command structure used by the storage controller, wherein the storage controller, in response to performing the at least one operation, is configured to not send an acknowledgement to the managing entity that the at least one operation has been performed.

7. The system of claim 6, wherein the storage controller comprises one or more storage media.

8. The system of claim 6, wherein the logic code includes state and event information for instructing the storage controller to perform a plurality of operations in response to observing a plurality of respective events.

9. The system of claim 6, wherein the storage controller is configured to store the data structure in nonvolatile memory coupled to the storage controller, and update state information stored in the data structure each time one of the operations is performed to reflect that the operation has been performed.

10. The system of claim 6, wherein the operation states of the storage controller are not monitored by the managing entity.

11. A system for managing operations performed in a data storage system, the system comprising:
a managing entity, comprising a processor, configured to send logic code from a managing entity to a storage controllers, the logic code defining a plurality of operation states and at least one operation to be performed by the storage controller upon detection of each of the operation states, wherein the logic code is based on a different command structure than a command structure used by the storage controller; and
the controller coupled to the managing entity, the storage controller, comprising a processor, and configured to:
monitor the storage controller for detecting a change in operation state of the storage controller;
detect the change in operation state of the storage controller based on the monitoring;
perform the at least one operation associated with the operation state in the logic code and/or data structure upon detecting the change in operation state of the storage controller;
compile the logic code at the storage controller to be compatible with the command structure of the storage controller,
wherein the storage controller performs the at least one operation without responding to the managing entity with an acknowledgement that the at least one operation has been performed, and
wherein the managing entity is configured to not monitor the change in operation state of the storage controller each time one of the operations is performed.

12. A computer program product comprising a non-transitory computer useable medium having a computer readable program, wherein the computer readable program when executed on a computer causes the computer to:
receive logic code and/or a data structure from a managing entity at a storage controller, the logic code and/or data structure defining a plurality of operation states and at least one operation to be performed by the storage controller upon detection of each of the operation states, wherein the logic code is based on a different command structure than a command structure used by the storage controller;
monitor the storage controller for detecting a change in operation state of the storage controller;
detect the change in operation state of the storage controller based on the monitoring; and
perform the at least one operation associated with the operation state in the logic code and/or data structure upon detecting the change in operation state of the storage controller, and without sending a response to the management entity with an acknowledgement of performance; and
compile the logic code to be compatible with the command structure of the storage controller.

13. The computer program product of claim 12, wherein the computer readable program includes code for causing the computer to store the data structure locally to the storage controller in nonvolatile memory and update state information stored in the data structure each time one of the operations is performed to reflect that the operation has been performed.

14. The computer program product of claim 12, wherein the operation states of the storage controller are not monitored by the managing entity.

* * * * *